Sept. 28, 1926.

A. DUDLER 1,601,565

PACKING AND MEASURING DEVICE

Filed May 22, 1925     2 Sheets-Sheet 1

INVENTOR.
Andrew Dudler,
BY
Geo. P. Kimmel   ATTORNEY.

Sept. 28, 1926.
A. DUDLER
1,601,565
PACKING AND MEASURING DEVICE
Filed May 22, 1925  2 Sheets-Sheet 2
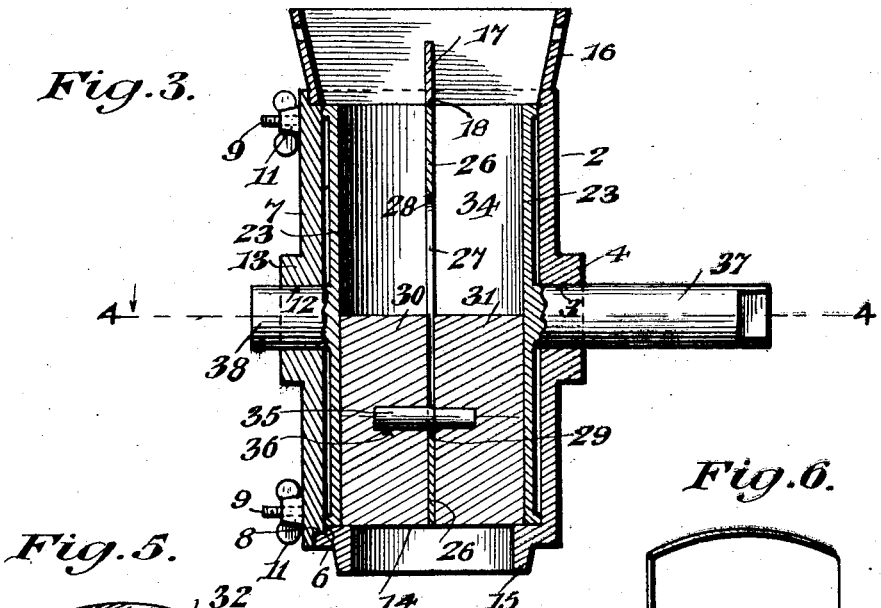
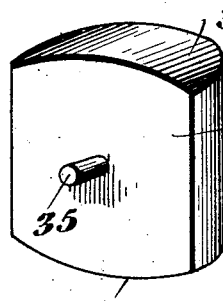
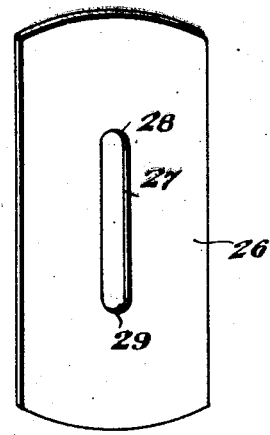
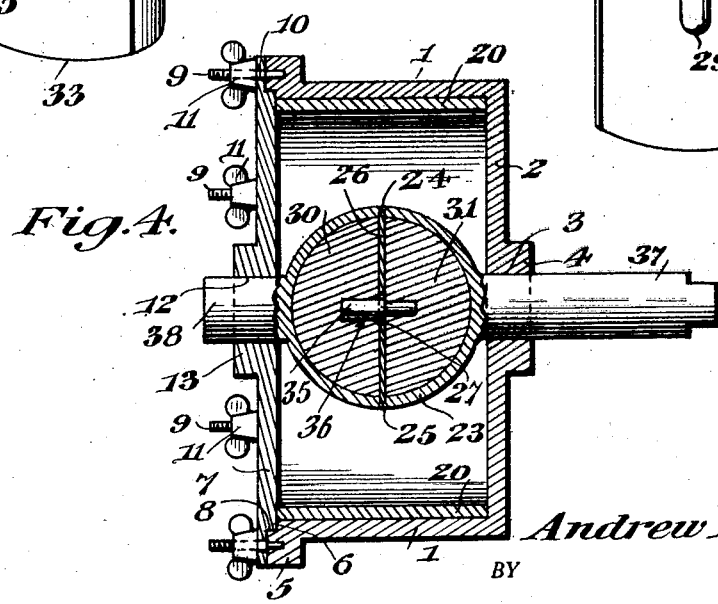
INVENTOR.
Andrew Dudler;
BY
Geo. J. Kimmel.
ATTORNEY.

Patented Sept. 28, 1926.

1,601,565

UNITED STATES PATENT OFFICE.

ANDREW DUDLER, OF ST. LOUIS, MISSOURI.

PACKING AND MEASURING DEVICE.

Application filed May 22, 1925. Serial No. 32,123.

This invention relates to a packing and measuring device designed primarily for measuring and packing ice cream, but it is to be understood that a device, in accordance with this invention, can be employed for any purposes for which it is found applicable, and the invention has for its object to provide, in a manner as hereinafter set forth, a device of the class referred to, having means for measuring a quantity of ice cream and packing or filling the measured quantity of cream in a paper cup or other container.

A further object of the invention is to provide, a device of the class referred to, in a manner as hereinafter set forth, with means whereby ice cream of different colors or flavors can be packed simultaneously in paper cups or other containers.

Further objects of the invention are to provide a measuring and packing device, in a manner as hereinafter set forth, which is simple in its construction and arrangement, strong, durable, compact, sanitary, thoroughly efficient and convenient in its use, capable of expeditiously measuring and packing a quantity of ice cream, and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figures 2 and 3 are vertical sectional views of the device, one taken at right angles to the other.

Figure 4 is a section on line 4—4, Figure 3.

Figure 5 is a perspective view of one of the packing plungers.

Figure 6 is a perspective view of the combined plunger guide and division plate.

Figure 1:
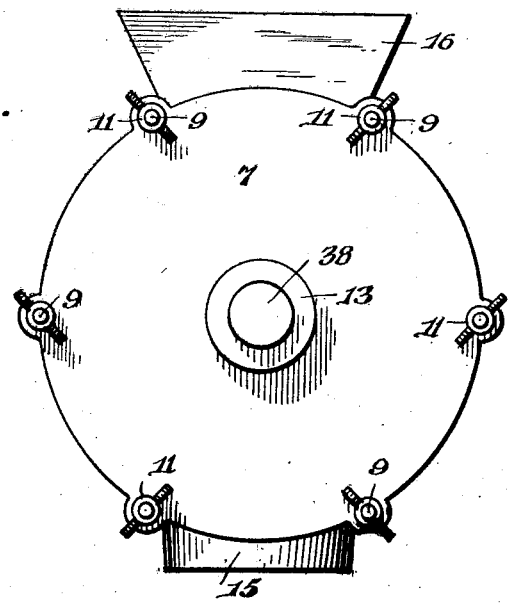
Figure 1 is a side elevation of an ice cream measuring and packing device, in accordance with this invention.
Figure 2:
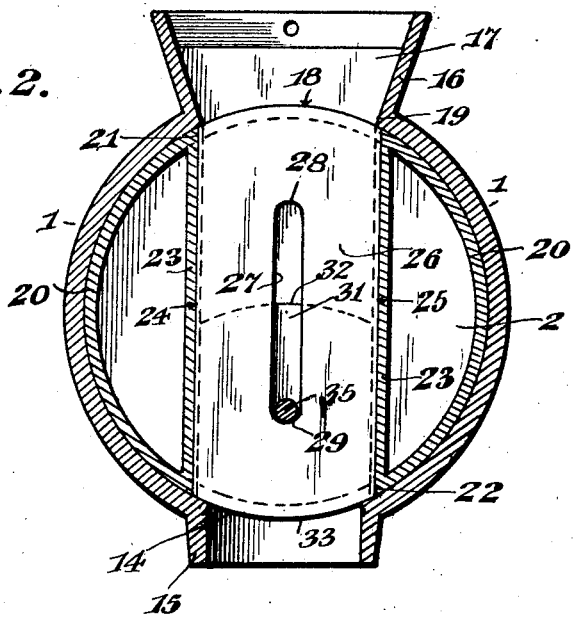

A measuring and packing device, in accordance with this invention, is constructed of non-corrosive metal and can be either manually or motor driven, and the device comprises a housing formed of a vertically disposed annular body portion 1 open at one end and having its other end closed by an integral circular plate 2, formed with a centrally disposed opening 3 and an annular boss 4, which registers with the opening 3 and is arranged on the outer face of the plate 2. The body portion 1, at the open side thereof, is formed with a laterally projecting annular flange 5 and also rabbeted, as at 6, to provide a seat for an end plate 7, which, when in position, closes the open end of the housing 1. The plate 7 is shouldered on its inner face, as at 8, to abut against the seat formed by the rabbet 6 and to bear against the flange 5. Fixedly secured to the flange 5 and extended therefrom, is a series of peripherally threaded retaining members 9, which extend through openings 10 formed in the perimeter of the plate 7, and mounted on the members 9 are winged nuts 11, which in connection with the members 9 provide means for detachably clamping the plate 7 in closure position with respect to the housing 1. The plate 7, centrally thereof, is formed with an opening 12 aligning with the opening 3, and on the outer face of the plate 7 a boss 13 is provided, which forms a continuation of the opening 12.

The body portion 1, at the bottom thereof, has a discharge opening 14 and a spout 15 which forms a continuation of the opening 14. The body portion 1, at the top thereof, and in alignment with the spout 15, is formed with a hopper 16, provided with a centrally disposed partition 17 for separating ice cream of different flavors or colors and which has its upper end positioned below the top of the hopper 16 and its lower edge 18 of a contour to form a continuation of the arc of the inner face of the body portion 1. The hopper 16 registers with an inlet opening 19 formed in the top of the body portion 1.

Arranged within the body portion 1 is a valve or controlling element 20 which is common to the spout 15 and inlet opening 19 and is in the form of an annular band provided at its top with a combined inlet and outlet opening 21, and at its bottom with a combined inlet and outlet opening 22. The openings 21, 22 are diametrically opposed, The element 20 snugly engages the inner face of the body portion 1, but the fit is such as not to prevent the revolving of the element 20 during the measuring and packing of the ice cream.

Formed integral with the element 20, as well as arranged therein, is a hollow cylindrical ice cream conducting member 23. The member 23 extends diametrically of the element 20 and the inner diameter of the member 23 is the same as the diameter of the openings 21 or 22. The inner face of the member 23 forms a continuation of the walls of the openings 21, 22. The diameter of the opening 21 or the opening 22 is greater than the diameter of the opening 14 or 19. The inner face of the member 23 is provided with a pair of diametrically opposed lengthwise extending grooves 24, 25, and each of said grooves extends into the walls of the openings 21 and 22.

Mounted in the grooves 24 and 25 is a combined partition and guide plate 26 having its top edge forming a continuation of the arc of the outer face of the element 20 and its lower edge forming a continuation of the arc of the outer face of the element 20. The plate 26 provides the conducting member 23 with two compartments whereby ice cream of different flavors or colors can be packed and measured. Each compartment is employed for a different colored or flavored ice cream. The plate 26 is provided with a centrally disposed lengthwise extending slot 27, having the end walls 28, 29, thereof providing stops for a purpose to be presently referred to.

Arranged within the conducting member 23, as well as separated and guided by the partition plate 26, is a pair of expelling or packing elements 30, 31 of segmental contour. Each end of each of said packing elements is of arcuate contour, as indicated at 32, 33, and which form continuations of the arc of the inner face of the element 20. The packing elements 30 and 31 may be of any length desired, preferably half the length of the conducting member 23 and not only act to force or pack the ice cream in a container, but also act in connection with the member 23 to provide a measuring space 34 for a quantity of cream. The measuring space 34 is formed between the upper ends of the elements 30, 31 and the opening 20 or 22 when it registers with the hopper 16 or the upper ends of said elements and opening 21 or 22 when the latter performs its inlet function for the cream to the conducting member 23.

The element 31 has fixed thereto a pin 35, which projects from the flat face thereof and extends through the slot 27 and into an opening 36 formed in the packing element 30, whereby the elements are slidably connected to the plate 26, and the pin 36 coacts with an end wall 28 or 29 for arresting the shifting movement of the packing elements in one direction.

The conducting member 23 is revolved on its transverse axis and on the movement of said member 23 the element 20 is carried therewith, and the latter functions to close the openings 14 and 19 simultaneously and intermittently, whereby the feed and discharge of the ice cream to and from the member 23 is cut off until said member 23 communicates with the hopper 16 and spout 15. The member 23 is revolved through the medium of an operating shaft 37, which extends through the opening 3 and boss 4, and said shaft 37 can be manually or motor driven. The shaft 37 is formed integral with the conducting member 23 and the latter has also formed integral therewith a stub shaft 38, which extends through the opening 12 and boss 13. The walls of the openings 3, 12 and bosses 4 and 13 provide bearings for the shafts 37 and 38.

The partition 17 and plate 26 provide means whereby the hopper 16 and conducting member 23 are divided so that a plurality of colors or flavors of ice cream can be supplied to and conducted through the member 23 and forced through the spout 15 into the container, whereby the cream packed will be of different colors or flavors.

The ice cream is supplied to the hopper 16 partially frozen, and from there it is fed to the member 23 and when the latter is revolved the feed to the member is cut off and the packing elements 30, 31 carried therewith, and as the member 23 continues to revolve, the packing elements 30 and 31 will shift towards the cream within the conducting member 23, and owing to the weight of the elements 30, 31, they will act to force the cream from the member 23 when the latter registers with the spout 15.

It is thought that the many advantages of an ice cream measuring and packing device, in accordance with this invention, can be readily understood, and although the preferred embodiment of the invention is as illustrated and described, yet it is to be understood that changes in the details of construction can be had which will fall within the scope of the invention as claimed.

What I claim is:—

1. A device for the purpose set forth comprising a stationary housing having an inlet and a discharge spout, a partitioned hopper opening into said inlet, a material receiving member of tubular form open at each end, a revoluble valvular element for simultaneously opening and closing said inlet and spout, said element arranged within the housing and bodily carrying said member, the latter being so arranged within said element as to have each end alternately register with said inlet and spout, a partition plate within said member to provide the latter with a pair of receiving compartments, and a pair of opposed packing elements within said member, each operating in a compartment, said elements connected together and slidably connected to said plate and providing in connection with said member and partition for the measuring of a quantity of material in a compartment and further for expelling the measured material from the compartment.

2. A device for the purpose set forth comprising a stationary housing having an inlet and a discharge spout, a material receiving member of tubular form open at each end, a revoluble valvular element for simultaneously opening and closing said inlet and spout, said element arranged within the housing and bodily carrying said member, the latter being so arranged within said element as to have each end alternately register with said inlet and spout, a partition plate within said member to provide the latter with a pair of receiving compartments, a pair of opposed packing elements within said member, each operating in a compartment, said elements connected together and slidably connected to said plate and providing in connection with said member, partition, valvular element and housing for the measuring of a quantity of material in a compartment and further for expelling the measured material from the compartment, said plate provided with means for arresting the shifting in either direction of said elements whereby the outer end of these latter will be positioned inwardly with respect to that end of the member closed by said elements, and a compartment supply hopper carried by the housing and alternately communicating with the ends of said member.

In testimony whereof, I affix my signature hereto.

ANDREW DUDLER.